(12) United States Patent
Bloom et al.

(10) Patent No.: US 7,777,784 B2
(45) Date of Patent: Aug. 17, 2010

(54) APPARATUS AND METHOD FOR GENERATING MULTIPLE IMAGES FROM A SINGLE IMAGE

(75) Inventors: Daniel M. Bloom, Loveland, CO (US); Wilfred F. Brake, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1015 days.

(21) Appl. No.: 10/178,232

(22) Filed: Jun. 25, 2002

(65) Prior Publication Data

US 2003/0234876 A1 Dec. 25, 2003

(51) Int. Cl.
*H04N 5/228* (2006.01)
*H04N 5/222* (2006.01)

(52) U.S. Cl. ............... 348/222.1; 348/333.05; 348/333.11

(58) Field of Classification Search .......... 348/162, 348/167, 207.99, 222.1, 223.1, 229.1, 231.3, 348/231.99, 333.01, 333.02, 333.05, 333.11, 348/333.12, 263; 382/162, 263, 167

See application file for complete search history.

(56) References Cited

U.S. PATENT DOCUMENTS

| 4,901,063 A | * | 2/1990 | Kimura et al. | ............... 345/530 |
| 6,097,901 A | * | 8/2000 | Parulski | ..................... 396/311 |
| 6,680,749 B1 | * | 1/2004 | Anderson et al. | ...... 348/231.99 |
| 6,903,762 B2 | * | 6/2005 | Prabhu et al. | ............ 348/207.1 |
| 2003/0095197 A1 | * | 5/2003 | Wheeler et al. | ............. 348/241 |

* cited by examiner

*Primary Examiner*—Sinh Tran
*Assistant Examiner*—Daniel M Pasiewicz

(57) ABSTRACT

A system and method for generating multiple processed images from a single captured image generated by an electronic imaging device. In one embodiment, a digital camera includes multiple sets of operating parameters which may be advantageously configured according to the demands of particular photographic environments. For each image captured by a digital camera as raw data, the data is processed according to each parameter set prior to compression, storage in temporary memory, and ultimate upload onto a computer or other permanent storage device.

25 Claims, 9 Drawing Sheets

APPARATUS AND METHOD FOR GENERATING MULTIPLE IMAGES FROM A SINGLE IMAGE

BACKGROUND

Digital cameras have recently come into widespread use. Digital cameras produce images of a scene which may be stored on a memory card, or the like as digital data. Such digital data can easily be processed by a computer and can easily be distributed through the Internet or other network to friends and family.

In a digital still camera, the quality of a picture generally varies greatly depending on exposure conditions. To control exposure, a camera has an automatic-exposure or AE mechanism for setting an appropriate exposure in response to how bright the light is when a picture is recorded and to a luminance distribution on a target object. However, even an AE mechanism has a limit, and it is not necessarily guaranteed that an optimal picture can always be recorded. Occasionally, the digital camera will process an image using incorrect illuminant parameters, for example, with parameters appropriate for fluorescent lighting when the lighting was actually incandescent. Processing an image according to an incorrect illuminant can, of course, substantially distort the processed picture. Also, in many cases, when a picture is taken with a digital camera, the user may prefer a lighter or darker image, or one with a different color balance, even though the original picture is adequate.

For these reasons, many digital cameras require extensive post-processing of images. Correctable flaws in pictures, including tone, color balance, and image sharpening can be minimized, and user preferences can be incorporated in post-processing. However, post-processing can be expensive for the photographer, both in the cost of appropriate software and an appropriate computer. It can also be tedious and time consuming to correct and perfect each image. Thus, a photographer may abandon the digital camera in favor of the more traditional film camera, which creates images that can be developed and printed immediately.

SUMMARY

A system and method for generating multiple processed images from a single captured image of an electronic imaging device is described. In one embodiment, a digital camera includes multiple sets of operating parameters. For each image captured by a digital camera as raw data, the data may be processed according to each parameter set prior to compression, storage in temporary memory, and ultimate upload onto a computer or other permanent storage device. Multiple processed images from each single captured image may be produced and displayed so that the user may choose and save the image that he or she finds most desirable.

Figure 1:
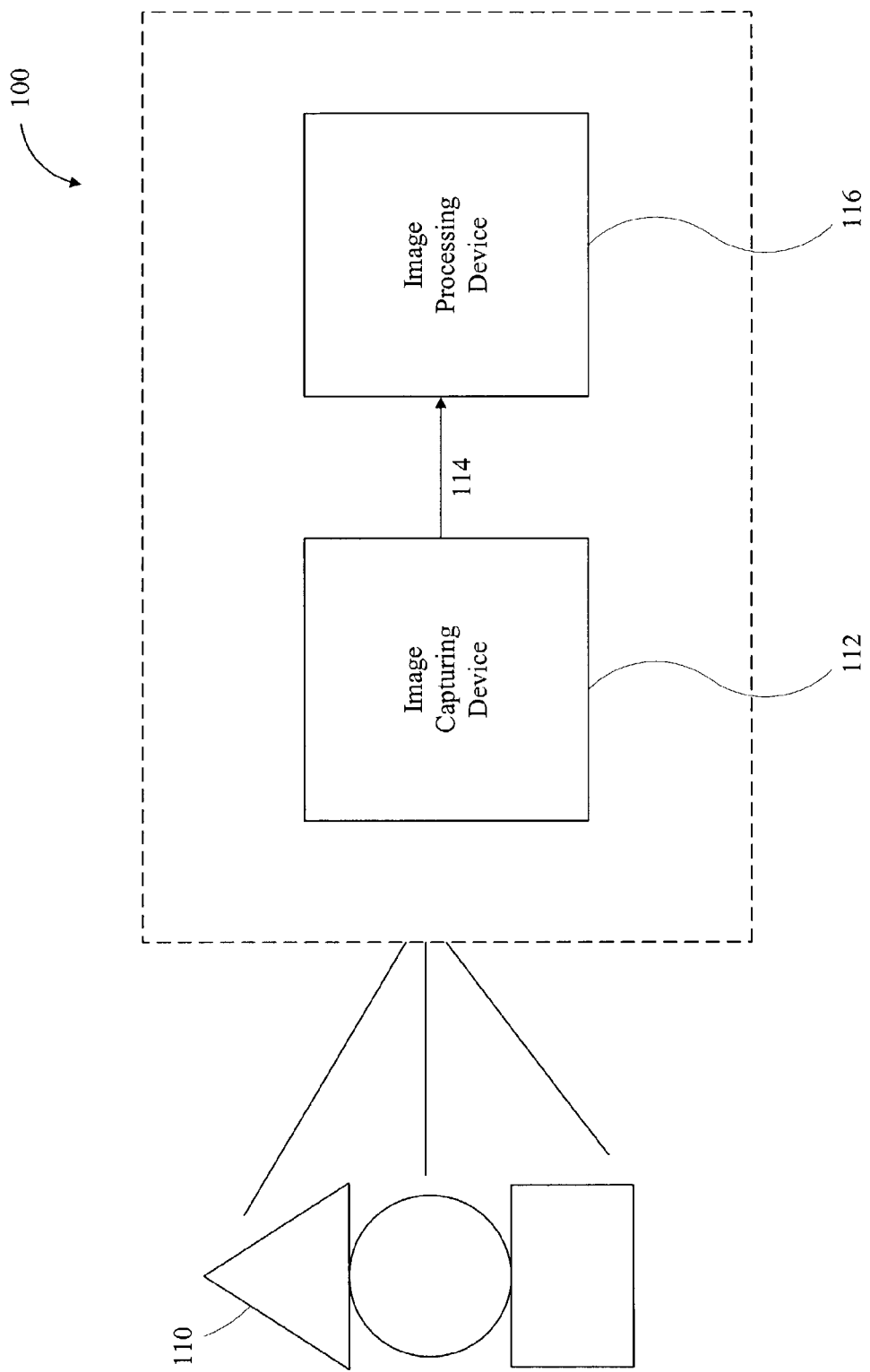
FIG. 1 illustrates a high-level block diagram of a digital camera.

DETAILED DESCRIPTION:

With reference now to FIG. 1 of the Drawings, there is illustrated therein a high-level block diagram of a digital camera, generally designated by the reference numeral 100, according to an embodiment of the present invention. The digital camera includes an image capturing device 112, an image processing device 116, and a system bus 114, which carries information from the image capturing device 112 to the image processing device 116. A photographer focuses the digital camera 100 upon an object, generally designated by the reference numeral 110, and signals the digital camera 100 to capture the image, e.g., using a shutter button or some other means. As is understood in the art, the image capturing device 112 captures an image of the object 110 in the form of raw image data and sends the raw image data to the image processing device 116 over the system bus 114. The image processing device 116 then performs various image processing functions on the image data before storing it on an internal memory. The function of the various camera components are described in more detail hereinbelow.

Figure 2:
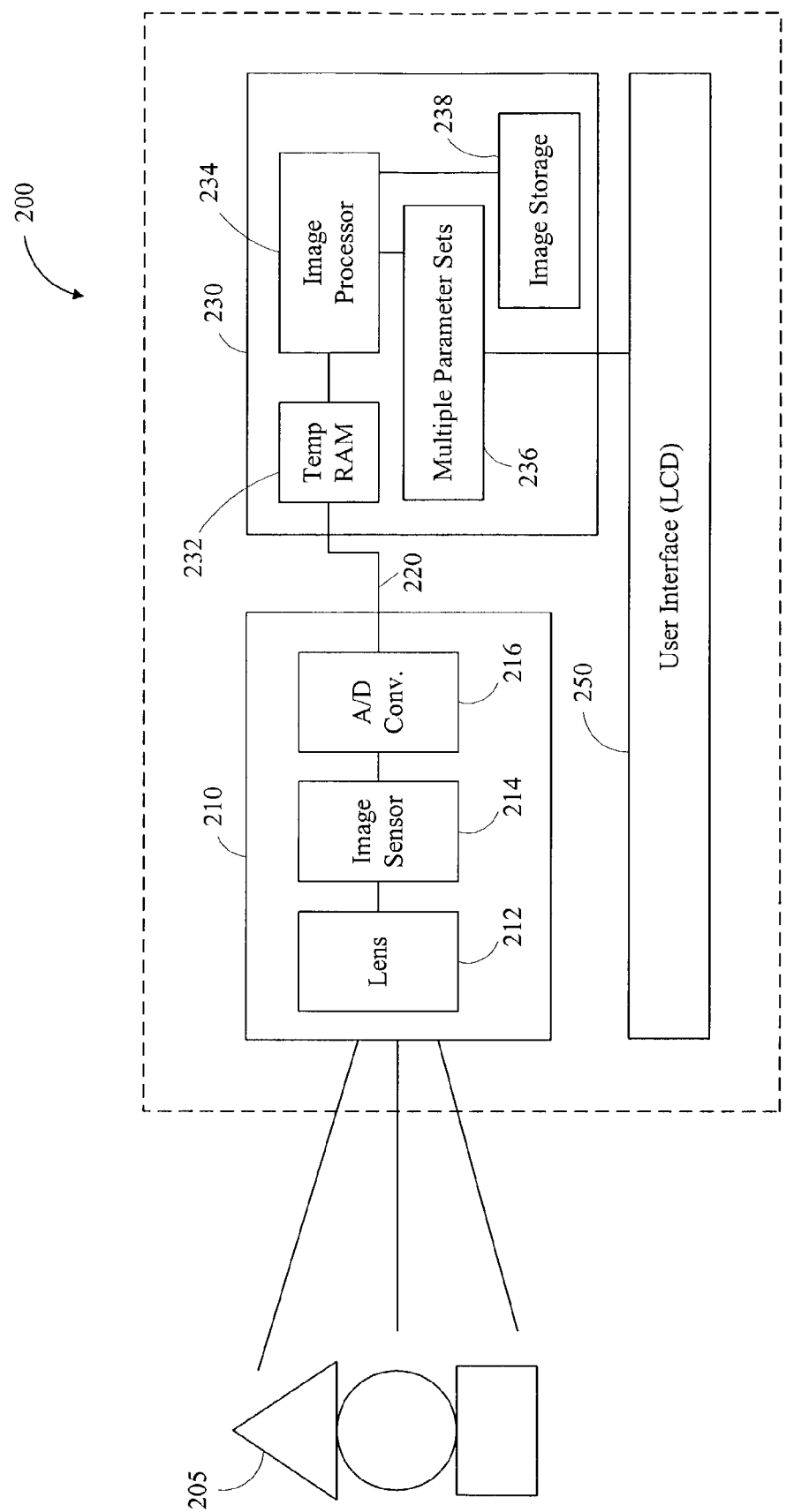
FIG. 2 illustrates a block diagram of a digital camera.

With reference now to FIG. 2 of the Drawings, there is illustrated a block diagram of a digital camera, generally designated by the reference numeral 200, which includes an image capturing device 210, an image processing device 230, and a user interface 250, all described in more detail hereinbelow.

As illustrated in FIG. 2, the image capturing device 210 of the digital camera 200 includes a lens 212, an image sensor 214, and an A/D converter 216. The image capturing device 210 receives light reflected from an object 205. The light is focused by the lens 212 to produce an image of the object on the image sensor 214, which may be, for example, a charge-coupled device (CCD). A user may instruct the digital camera 200 using a shutter button or some other means to capture a selected image.

The object which is currently imaged on the photosensor is converted to digital data. First, analog image information corresponding to the particular object 205 may be generated in respective photosites (pixels) of the image sensor 214. The image sensor 214 may include a color filter array pattern, described in more detail hereinbelow. In one embodiment the analog image information output by the sensor 214 represents an uninterpolated stream of unique color values, one value for each pixel, corresponding to the color pattern of the color filter array. In a Bayer color filter array pattern, the analog image information represents an uninterpolated stream of color values, one of red, green, or blue, at each pixel.

With reference again to FIG. 2 of the Drawings, the raw analog image data may be converted, at the A/D converter 216, to raw digital image data. In other words, the analog image signals are applied to an A/D converter 216, which generates digital image data from the analog input signals for each picture element. This digital image data is, for example, uninterpolated Bayer pattern image data in which each photosite provides a single red, green, or blue value corresponding to its position in the Bayer pattern. Additional elements to improve the quality of the received image at the image sensor 214 and to improve the quality of the analog image data at the A/D converter 216 may be included in the image capturing device 210.

After the uninterpolated analog image data has been converted to digital image data, the image data may be transferred over a system bus 220 from the image capturing device 210 to the image processing device 230 for processing and storage.

As noted in FIG. 2, the image processing device 230 of the digital camera 200 may include a temporary RAM 232, an image processor CPU 234, a storage memory containing multiple parameter sets 236, and an image storage 238.

The image processing device 230 receives digital image data from the system bus 220 and stores the data in the temporary RAM 232 prior to processing. As is understood in the art, digital camera processing includes utilizing multiple parameter sets stored in memory 236 to format raw image data. Each parameter set may be programmed by the user or set by default and may include color tone, white balancing, sharpening, and more. During processing, the digital camera processes the image for the most probable illuminant of the photographic environment, such as indoor or outdoor lighting. The image processing CPU 234 may consist of parallel processors to more efficiently process the image data. After processing, the image may be stored in memory 238, as is understood in the art.

Figure 3:
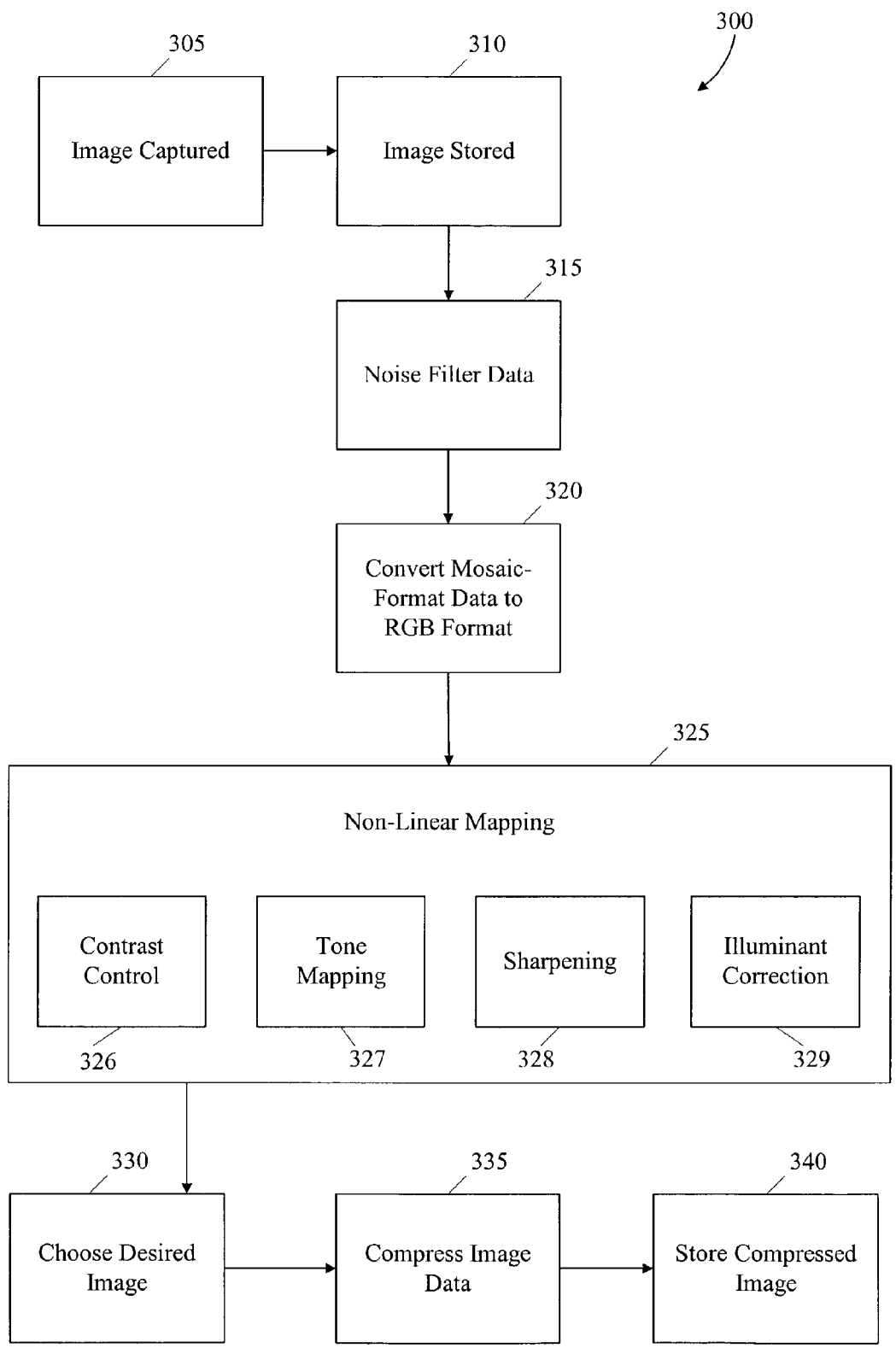
FIG. 3 illustrates a flow-chart that describes the processing performed on the image in the image processing device of FIGS. 1 and 2.

With reference now to FIG. 3, there is shown a flowchart illustrating, in greater detail, image processing functions of the image processing device 230 of FIG. 2, generally designated in the FIG. 3 by the reference numeral 300. At step 305, a digital image is captured, i.e., digital image data is created and is received by the image processing device 230 from the system bus 220. As shown in FIG. 3, at step 310, the digital image data may be stored in temporary RAM 232 of FIG. 2.

At step 315, raw digital image data, from temporary RAM 230, is filtered by a noise filter to generate noise-filtered digital image data. Depending upon how much the user wants to brighten or darken an image, this step may be omitted during the processing (editing) of certain images. If the user brightens an image a great deal, then additional noise filtering (after the initial image processing) may be necessary. As is well understood in the imaging art, data from the image capturing device 210 is typically in the format:

R G R G R G . . .
G B G B G B . . .

where the data representation is R=red, G=green, and B=blue.

With reference again to FIG. 3, particularly, at step 320, the raw digital image data, which may be in a mosaic format, may be converted into RGB format data. RGB format data is typically in the format:

RGB RGB RGB . . .
RGB RGB RGB . . .

At step 325, the RGB data is converted for non-linear display, according to particular algorithms. For example, an image is usually converted using tone-mapping and contrast control. The 14-bit RGB data produced at step 320 may be converted to 8-bit RGB data. Other information, including a predicted illuminant of the camera's photographic environment and user preferences, may be used in conversion as well. If this information is inaccurate, or if ambiguities exist between possible processing procedures, then several processed images are produced instead of only one. Examples include one image processed once for a lighter image and once for a darker image, i.e., contrast control 326, one image processed once for more blue coloring and once for more red coloring, i.e., tone mapping 327, one image processed once for more sharpening and once for less sharpening 328, or one image processed once for a direct sunlight illuminant and once for an indoor illuminant, i.e., illuminant correction 329. It should be well understood that the above processes are exemplary, and other parameters are possible and may be defined by the user of the camera.

With reference now to FIGS. 4A-D, there are illustrated therein examples of the results of the process and parameters as described in connection with FIG. 3 hereinabove. Each image in FIGS. 4A-D shows the effect of different processing, and is available to be chosen by a user and saved. The choice of images may be according to user taste and preference, i.e., in this embodiment each image is no more and no less correct than another.

Figure 4A:
FIGS. 4A-4D illustrate variations in processing of a single image.

The image shown in FIG. 4A has been processed once according to the auto-exposure of the camera. This image is the image that would be taken and processed normally on any digital camera. The visibility of the individual strands of the boy's hair, the pupils, irises, and reflected light in the boy's eyes, and the definition on the boy's right hand are readily apparent in the image.

Figure 4B:

The image shown in FIG. 4B has been processed brighter than the image of FIG. 4A. The differences between the two images are subtle but visible. The boy's hair is less dark and the individual strands of hair are easier to distinguish. The boy's irises are more noticeably lighter than his pupils, and the light in his eyes is brighter. The definition in the boy's right hand is more apparent than in the image of FIG. 4A. However, it should be understood that the differences between the two images are primarily aesthetic.

Figure 4C:

The image shown in FIG. 4C has been processed softer than the image of FIG. 4A. The image of FIG. 4C emphasizes the boy's overall look and his face, rather than particular details such as the differences between single strands of hair and the difference between the boy's pupils and irises. The differences between the two images are subtle but visible. The boy's hair is darker and the individual strands of hair are more difficult to distinguish. The boy's pupils are indistinguishable from his irises, and the light in his eyes is less pronounced than the light in his eyes in the image of FIG. 4A. As before, it should be understood that the differences between the two images are primarily aesthetic.

Figure 4D:

The image shown in FIG. 4D has been processed brighter and sharper than the image of FIG. 4A. The differences between the two images are distinct. The details of the image in FIG. 4D are obvious, and contrast clearly with the image of FIG. 4A. The boy's hair is much lighter and each individual strand of hair is easy to distinguish. The boy's irises are noticeably lighter than his pupils, and the light in his eyes is sharply defined. The details in the boy's right hand, including the wrinkles and reflected light on his forefinger, are more apparent than in the image of FIG. 4A. As above, it should be understood that the differences between the two images are aesthetic in nature.

With reference again to FIG. 3 of the Drawings, the multiple processed images generated in step 325 are stored in the temporary RAM 232 of FIG. 2. At step 330, the user may choose the particular desired processed image and discard the others. Alternatively, the non-selected images may remain in memory until storage is needed later or on power off. The interface between the user and the camera is described in more detail hereinbelow.

If the user, instead, continues taking pictures or does not wish to examine the multiple processed images at that time, other options are possible depending upon the size of the temporary RAM 232 of FIG. 2. If the temporary RAM 232 is large, the images remain stored until the user chooses the desired image. Once the desired image has been chosen, the other images may be deleted from memory and the desired image fully processed in the remaining steps of FIG. 3. If the temporary RAM 232 is small, a single image is chosen and the other images are discarded, thus freeing room in the temporary RAM 232 for more images. Also, the image storage 238 may be utilized to store the multiple processed images until the user examines the images and chooses one.

At step 335, the image data may be compressed according to compression parameters stored in the aforementioned parameter memory 236. Typically, this compression is a JPEG compression with variable compression rates depending on the desired size of the compressed image and the ratio of compression, as programmed by the user.

At step 340, the compressed image is stored in the image storage 238, which could be a removable memory card, one of several formats described in more detail hereinbelow. The image storage 238 may alternatively be connected to the camera 100 by a communications port, such as a Universal Serial Bus, or USB port, as is understood in the art.

Removable memory cards are well known to those skilled in the art. For example, removable memory card 238 may be adapted to the Compact Flash interface standard, such as described in the CompactFlash Specification Version 1.3, published by the CompactFlash Association, Palo Alto, Calif., Aug. 5, 1998. Alternatively, removable memory card 238 can be adapted to the PCMCIA card interface standard, as described in the PC Card Standard, Release 2.0, published by the Personal Computer Memory Card International Association, Sunnyvale, Calif., September 1991. Removable memory card 238 can also be adapted to the well known secure digital (SD), solid state floppy disk card (SSFDC) or Memory Stick formats. Other types of non-volatile digital memory devices, such as magnetic hard drives, magnetic tape, or optical disks, could alternatively be used to store the digital images.

The parameters of the image and compression used to generate images and stored in the parameter memory 236 may be defined by the user or by default. These parameters may include color balancing, white balancing, tone-mapping, and other parameters for image processing, and preferred size of image file in JPEG format, as well as compression ratio, which determines loss of image, for image compression. The aforementioned user interface 250 allows the user to manipulate the parameters of the parameter memory 236 using several buttons, and is described in more detail hereinbelow.

Figure 5:
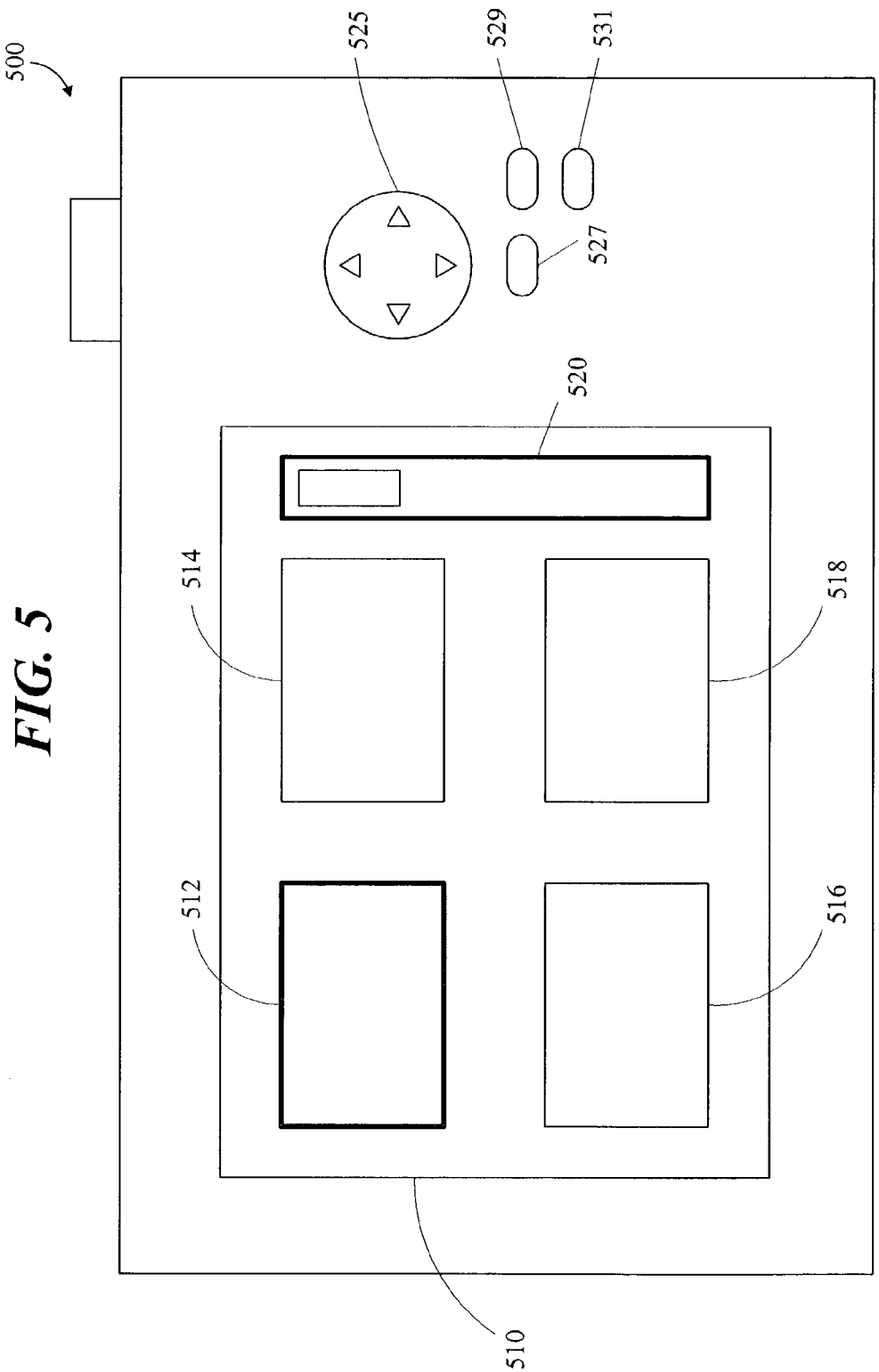
FIG. 5 illustrates an embodiment of a user interface screen.

With reference now to FIG. 5, there is illustrated a possible configuration of a user interface. The digital camera, generally designated by the reference numeral 500, has a viewscreen 510, e.g., an LCD, that displays the multiple processed images. As described in reference to FIG. 3, each single captured image may produce two or more processed images which are then shown to the user on the viewscreen 510. In "auto-mode", the camera automatically determines several processing parameters for manipulating the captured image into a final output. Such parameters include color balance, tone map and sharpening. Many times there is more than one optimal answer for the selections and hence it comes down to the user interpreting what he or she believes is the aesthetically "best" picture.

In the exemplary configuration shown in FIG. 5, four processed images are shown 512, 514, 516, and 518, respectively, as well as a scroll bar 520 that indicates that more processed images are available but not shown in the viewscreen 510. The user may highlight an image 512 and select that image for viewing. The various buttons 525, 527, 529, and 531 allow the user to control the viewscreen 510 in a variety of ways described in more detail hereinbelow. The navigation button 525 is used to navigate between the images on the viewscreen 510 and the images indicated by the scroll bar 520. The select button 527 selects an image for large viewing, and the selected image is shown full-size in the viewscreen 510. The select button 527 may be used to select and view full-size several or all of the images. The delete button 529 deletes the highlighted image from memory. The save button 531 indicates that the highlighted image is the image preferred by the user, and the image is compressed and saved. In this embodiment, after one processed image is saved, all other images are automatically deleted from memory.

Figure 6:
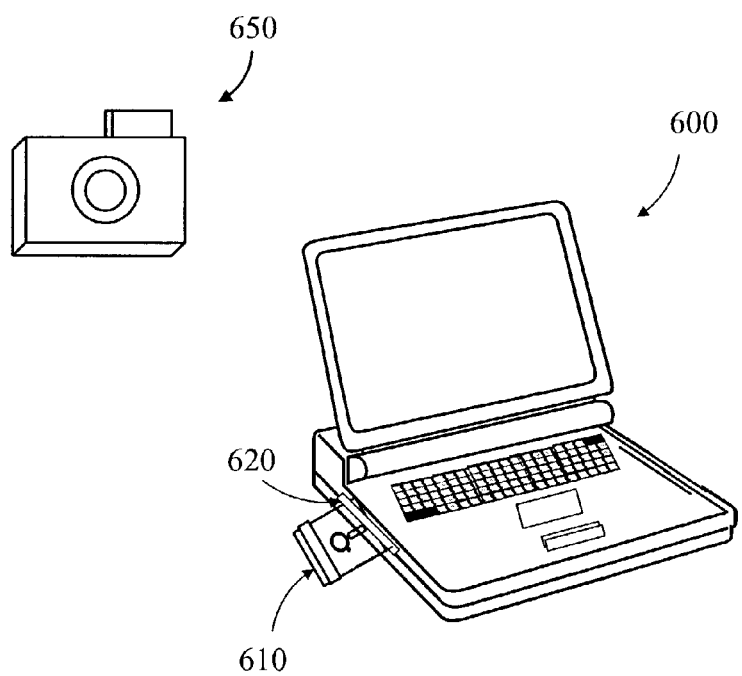
FIG. 6 illustrates a computer with installed image processing software.

In an alternative embodiment the above described processing of raw image data and display of processed images are carried out on a multipurpose computer equipped with appropriate storage, such as a conventional personal computer 600 shown in FIG. 6, rather than in the digital camera. The computer 600 may be provided access to the raw image data as by insertion of a removable memory card 610 from a digital camera 650 into a card slot 620 on the computer, etc. In this embodiment the camera 650 stores only raw image data or minimally processed data on the camera memory device. Alternatively, some of the above described image processing steps may be carried out in the camera 650 and the remainder may be carried out on the computer.

The foregoing description of the present invention provides illustration and description, but is not intended to be exhaustive or to limit the invention to the precise one disclosed. Modifications and variations are possible consistent with the above teachings or may be acquired from practice of the invention. Thus, it is noted that the scope of the invention is defined by the claims and their equivalents.

What is claimed is:

1. A digital camera comprising:
    an image capturing device;
    an image processing device, said image processing device being configured to process on the digital camera an image captured by said image capturing device using multiple alternative processing settings of a parameter that pertains to image quality before said image is available for review by a user such that said image processing device generates from said captured image multiple versions of said captured image, said multiple image versions having varied image quality to enable a user to select the version having the best image quality; and
    an image storage device that is configured to store a selected one of said multiple image versions.

2. The digital camera according to claim 1, said camera further comprising:
    an interface screen configured to display said multiple image versions, wherein a preferred one of said multiple image versions is selectable by the user.

3. The digital camera according to claim 1, wherein said processing settings are selectable by the user.

4. The digital camera according to claim 1, wherein said processing settings are set by default.

5. The digital camera according to claim 1, wherein said parameter is selected from a group consisting of tone mapping, color balancing, sharpening, contrast, and predicted illuminant.

6. A method for generating within a digital camera multiple versions of images from a single captured image, said method comprising:
    processing the single captured image using multiple alternative processing settings of a parameter that pertains to image quality before said image is available for review by a user; and generating multiple versions of said captured image, said multiple image versions having varied image quality to enable a user to select the version having the best image quality.

7. The method according to claim 6, further comprising: displaying said multiple image versions to the user of said digital camera.

8. The method according to claim 7, further comprising: receiving from the user selection of one of said multiple image versions.

9. The method according to claim 8, further comprising: saving a selected one of said multiple image versions; and automatically deleting the other of said multiple image versions.

10. The method according to claim 6, wherein said processing settings are set by the user.

11. The method according to claim 6, wherein said processing settings are set by default within said digital camera.

12. The method according to claim 6, wherein said parameter is selected from a group consisting of tone mapping, color balancing, sharpening, contrast, and predicted illuminant.

13. A digital camera comprising:
a camera body; and
means, in said camera body, for generating multiple image versions from a single captured image by applying multiple alternative processing settings of a parameter that pertains to image quality to said single captured image before said single captured image is available for review by a user.

14. A digital camera comprising:
means for generating raw image data representative of an image of an object;
means for processing said raw image data before said image is available for review by a user by applying multiple alternative processing settings of a parameter that pertains to image quality to generate multiple versions of the same image having varied image quality;
means for displaying said multiple image versions to a user to enable a user to select the version having the best image quality; and
means for enabling the user to select the image version having the best image quality.

15. A method for generating multiple processed images from a single captured image, said method comprising:
processing the single captured image on a digital camera using multiple alternative processing settings of a parameter that pertains to image quality before said image is available for review by a user; and
generating multiple versions of said single captured image, each respective image version varying from another in terms of image quality.

16. A method of saving image data comprising:
generating unprocessed image data representative of an image of an object;
before an image is available for review by a user processing said unprocessed image data using multiple alternative processing settings of a parameter that pertains to image quality to produce multiple versions of an image having varied image quality;
displaying said multiple image versions to a user to enable the user to select the version having the best image quality; and
saving one of said multiple image versions selected by the user.

17. The camera of claim 1, wherein said image processing device is configured to process said image captured by said image capturing device after temporary storage of said image in random access memory of said camera but before permanent storage of said image in an image storage device of said camera.

18. The method of claim 6, wherein processing the single captured image comprises processing the single captured image after temporary storage of said image in random access memory of said camera but before permanent storage of said image in an image storage device of said camera.

19. The camera of claim 13, wherein said means for generating multiple image versions comprises means for generating multiple image versions after temporary storage of said single captured image in random access memory of said camera but before permanent storage of said single captured image in an image storage device of said camera.

20. The camera of claim 14, wherein said means for processing said raw image data comprises means for processing said raw image data after temporary storage of said raw data in random access memory of said camera but before permanent storage of an image associated with said raw data in an image storage device of said camera.

21. The method of claim 15, wherein processing said single captured image comprises processing said single captured image after temporary storage of said image in random access memory of said camera but before permanent storage of said image in an image storage device of said camera.

22. The method of claim 16, wherein processing said unprocessed image data comprises processing said unprocessed image data after temporary storage of said image data in random access memory of said camera but before permanent storage of an image associated with said image data in an image storage device of said camera.

23. The digital camera according to claim 1, wherein said image processing device is further configured to process on the digital camera the image captured by said image capturing device using multiple alternative processing settings of a plurality of parameters that pertain to image quality before said image is available for review by a user.

24. The digital camera according to claim 23, wherein the plurality of parameters are selected from the group consisting of tone mapping, color balancing, sharpening, contrast, and predicted illuminant.

25. The method of claim 6, and wherein processing the single captured image comprises using multiple alternative processing settings of plurality of parameters that pertain to image quality before said image is available for review by a user.

* * * * *